(12) United States Patent
Tanabe

(10) Patent No.: US 8,350,779 B2
(45) Date of Patent: Jan. 8, 2013

(54) DISPLAY CONTROLLING APPARATUS AND IMAGE PROCESSING APPARATUS

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 12/639,723

(22) Filed: Dec. 16, 2009

(65) Prior Publication Data

US 2010/0157174 A1      Jun. 24, 2010

(30) Foreign Application Priority Data

Dec. 19, 2008    (JP) ................................. 2008-324172

(51) Int. Cl.
*G09G 5/00*   (2006.01)
(52) U.S. Cl. ........................................ 345/3.1; 345/501
(58) Field of Classification Search ........................ None
See application file for complete search history.

(56) References Cited

U.S. PATENT DOCUMENTS 7,206,548 B1*  4/2007  Sumler et al. ............. 455/67.11
7,966,371 B2*  6/2011  Mao et al. ..................... 709/204
2006/0209340 A1  9/2006  Ishii
2008/0082293 A1*  4/2008  Hochmuth ................... 702/178

FOREIGN PATENT DOCUMENTS

JP    2006-262116 A    9/2006

* cited by examiner

*Primary Examiner* — Muhammad N Edun
(74) *Attorney, Agent, or Firm* — Carter, DeLuca, Farrell & Schmidt LLP

(57) ABSTRACT

A display controlling apparatus that is capable of communicating with an image processing apparatus that sends image data to the display controlling apparatus in response to a notification from the display controlling apparatus, includes the following elements: a sending unit configured to send the notification to the image processing apparatus; a first receiving unit configured to receive the image data sent from the image processing apparatus in response to the notification; and a first computing unit configured to compute a first time required to display the image data received by the first receiving unit. The sending unit sends a new notification to the image processing apparatus at a timing based on the first time computed by the first computing unit.

10 Claims, 13 Drawing Sheets

DISPLAY CONTROLLING APPARATUS AND IMAGE PROCESSING APPARATUS

BACKGROUND OF THE INVENTION

1. Field of the Invention

The present invention relates to an image transmission system and an image transmission method of sending an image generated by an information processing apparatus such as a personal computer (hereinafter abbreviated as "PC") to a display controlling apparatus such as a projector.

2. Description of the Related Art

Recently, projectors that project image signals received from PCs onto screens are often used when presentations are given at conferences and seminars.

Image signals are sent and received between a PC and a projector generally by establishing an analog connection using an analog RGB cable. Now, attention has been paid to an image transferring system that connects a PC to a projector via a network, because of the following reasons: it is bothersome to establish an analog connection; it is difficult to establish a connection from a remote place; and there is a need to connect multiple PCs to a projector.

In order to realize this image transferring system, so-called screen capturing has been periodically performed on a screen displayed on an image processing apparatus such as a PC, and image data obtained by the screen capturing has been sent to a display apparatus such as a projector.

In the above-described image transferring system, a delay time occurs until the screen captured by using the PC is transmitted to a network and the transmitted screen data is displayed on the projector. When the delay time becomes longer, the user feels uncomfortable when operating the PC while looking at the projector. It thus becomes necessary to reduce the delay time. When the screen is to be captured at certain intervals, even images where the screen is unchanged are sent. Since such redundant images are sent, the delay time is increased. Therefore, the screen capturing is generally performed at a timing at which the screen of the PC is updated.

Japanese Patent Laid-Open No. 2006-262116 discloses a method of monitoring the most recent screen stored in a screen storage unit and the subsequent screen stored in a video memory by using a screen change monitoring unit. When it is determined that the most recent screen is changed, the screen stored in the video memory is captured, and the captured screen is sent from an image sending unit via a network to an image receiving apparatus.

Normally, an image obtained by capturing the screen by using a PC is, for example, compressed and sent to a display apparatus. The display apparatus, which has received the compressed image data, decodes the compressed image data and displays the decoded image data. In general, a display apparatus whose processing rate is low takes time to decode data. Therefore, when an image captured after the screen has been updated is sent from the PC, the display apparatus is still decoding the previous image. It takes time for the display apparatus to be ready to process the received image. As a result, data transfer is not efficiently performed, and a delay time until the screen captured by the PC is actually displayed on the display apparatus is increased.

SUMMARY OF THE INVENTION

According to an aspect of the present invention, there is provided a display controlling apparatus that is capable of communicating with an image processing apparatus that sends image data to the display controlling apparatus in response to a notification from the display controlling apparatus. The display controlling apparatus includes the following elements: a sending unit configured to send the notification to the image processing apparatus; a first receiving unit configured to receive the image data sent from the image processing apparatus in response to the notification; and a first computing unit configured to compute a first time required to display the image data received by the first receiving unit. The sending unit sends a new notification to the image processing apparatus at a timing based on the first time computed by the first computing unit.

According to an aspect of the present invention, there is provided an image processing apparatus that is capable of communicating with a display controlling apparatus. The image processing apparatus includes the following elements: a capturing unit configured to capture image data; a sending unit configured to send the image data captured by the capturing unit to the display controlling apparatus; and a receiving unit configured to receive a first time required for the display controlling apparatus to display the image data sent by the sending unit. The capturing unit captures new image data at a timing based on the first time received by the receiving unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DESCRIPTION OF THE EMBODIMENTS

Exemplary embodiments, features and aspects of the present invention will now be described in detail below with reference to the attached drawings.

Figure 1:
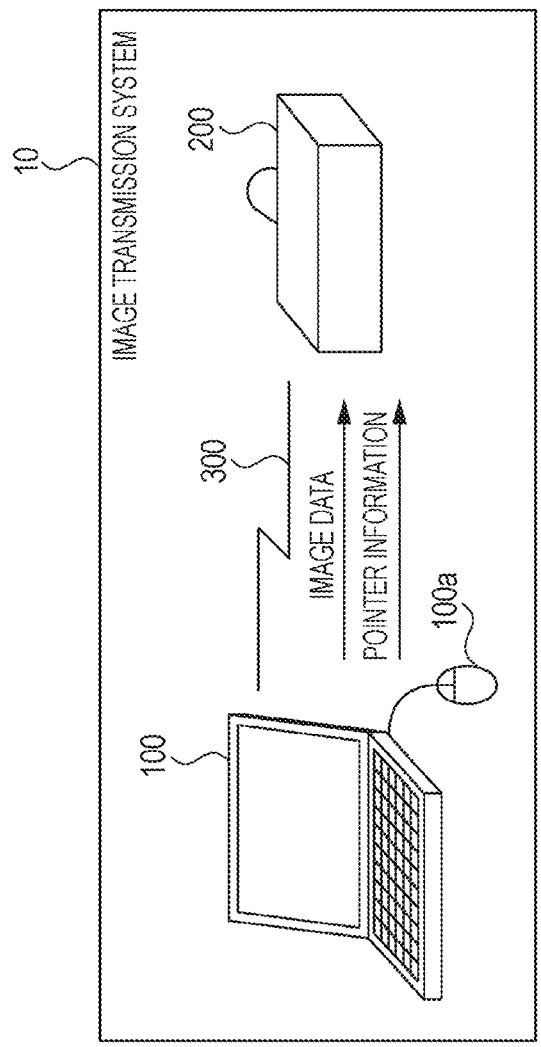
FIG. 1 is a system diagram of a PC and a projector according to an embodiment.

FIG. 1 is a diagram illustrating an image transmission system according to an embodiment of the present invention in which an image processing apparatus and a display controlling apparatus are connected to each other so that they can communicate with each other. An image transmission system 10 of the present embodiment includes a PC 100 which is an example of the image processing apparatus and a projector 200 which is an example of the display controlling apparatus. The PC 100 and the projector 200 form a network via a local area network (LAN) 300. The role of each apparatus will be briefly described. The PC 100 can send an image signal displayed on a display to the projector 200 via the network. The projector 200 receives an image signal sent from the PC 100, converts the image signal into a format that can be output, and displays the image signal. At the same time, a pointer on a Windows® system of the PC 100 is operated by using a mouse 100a. Apart from the image data, the pointer display position is sent to the projector 200. The Windows® system is a graphical user interface (GUI) realized by Windows®, which is Microsoft's operating system (hereinafter abbreviated as "OS"). With a GUI, unique regions are allocated to multiple tasks, and screen outputs can be multiplexed.

Figure 2:
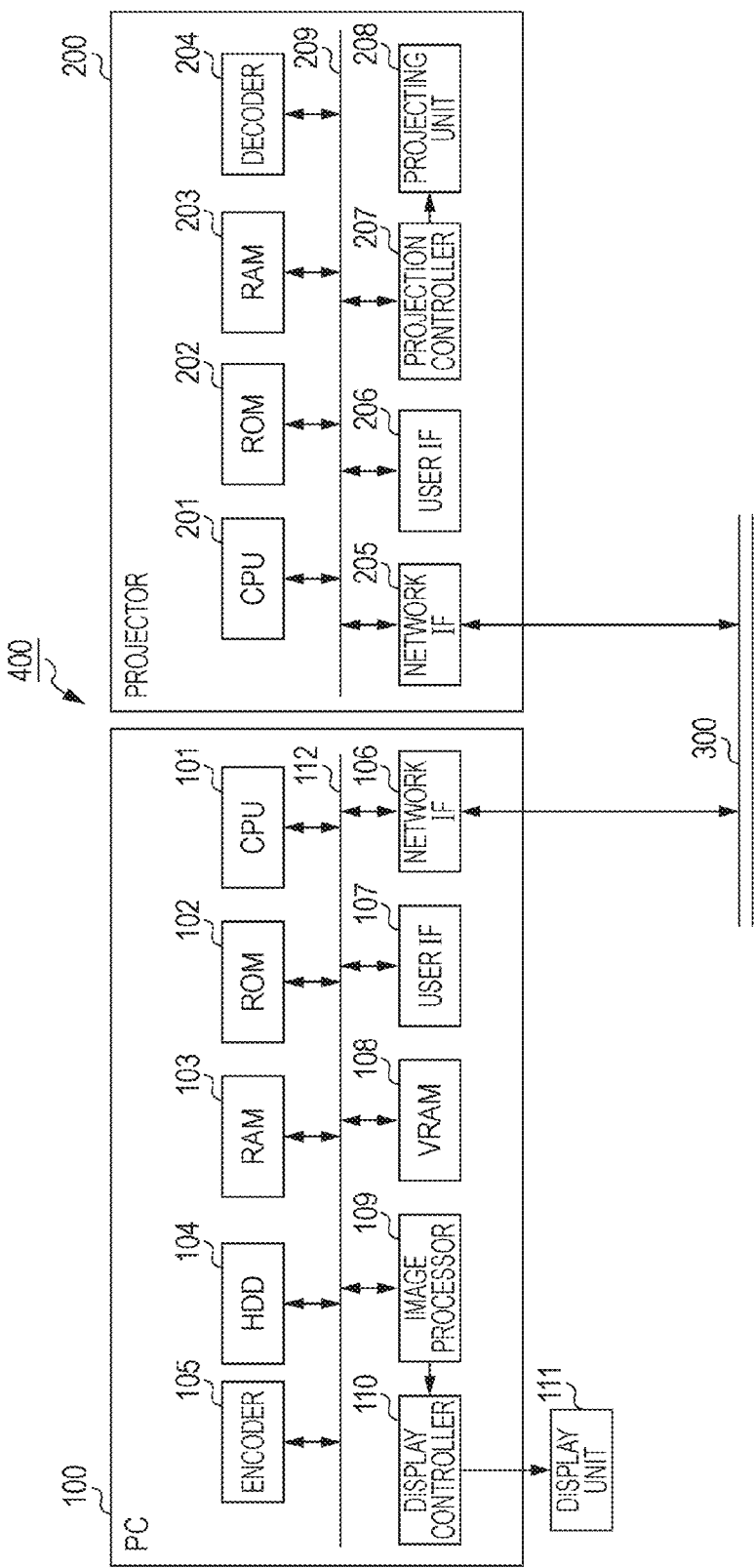
FIG. 2 is a schematic block diagram of the embodiment.

In the present embodiment, FIG. 2 is a schematic block diagram of a display system 400 including the PC 100 and the projector 200 illustrated in FIG. 1.

The PC 100 includes a central processing unit (CPU) 101, a read-only memory (ROM) 102 for storing control programs describing procedures performed by the CPU 101, and a random-access memory (RAM) 103 that serves as a work memory and temporarily stores control programs and data. The PC 100 further includes a hard disk drive (HDD) 104 for storing programs such as applications and OS, and data, and an encoder 105 for compressing display data to be displayed by the PC 100. The PC 100 further includes a network interface (IF) 106 that is an interface for communicating with the projector 200, a server, or the like via the LAN 300 or the like, and a user IF 107 that processes a user input entered by using a keyboard or a pointing device (mouse 100a). The PC 100 further includes a video RAM (VRAM) 108 storing an image to be displayed by the PC 100, an image processor 109, a display controller 110, a display unit 111 such as a liquid crystal display (LCD), and an internal bus 112 that interconnects these elements.

The projector 200 includes a CPU 201, a ROM 202 for storing control programs describing procedures performed by the CPU 201, and a RAM 203 that serves as a work memory and temporarily stores control programs and data. The projector 200 further includes a decoder 204 for decoding compressed data that has been compressed in a certain compression format. The projector 200 further includes a network IF 205 that is an interface for connecting to the PC 100, and a user IF 206 that processes a user input entered by using various operation buttons, an operating remote control, or the like. The projector 200 further includes a projection controller 207 for outputting an image, a projecting unit 208 that includes a liquid crystal panel onto which an input image is projected, a driver for driving the liquid crystal panel, a lens, a driving system for driving the lens, and a light source, and an internal bus 209 that interconnects these elements. Each of the PC 100 and the projector 200 has a timer for measuring time.

The hardware structure of each apparatus in the present embodiment is not limited to the foregoing. For example, one piece of hardware may control each apparatus, or multiple pieces of hardware may individually perform parts of processing and control the overall apparatus.

In the present embodiment, the PC has been used as an example of the image processing apparatus, and the projector has been used as an example of the display controlling apparatus. However, the image processing apparatus and the display controlling apparatus are not limited to these apparatuses. For example, examples of the image processing apparatus include a digital camera and a cellular phone, and examples of the display controlling apparatus include a television and an apparatus that controls a display such as a monitor.

Figure 8:
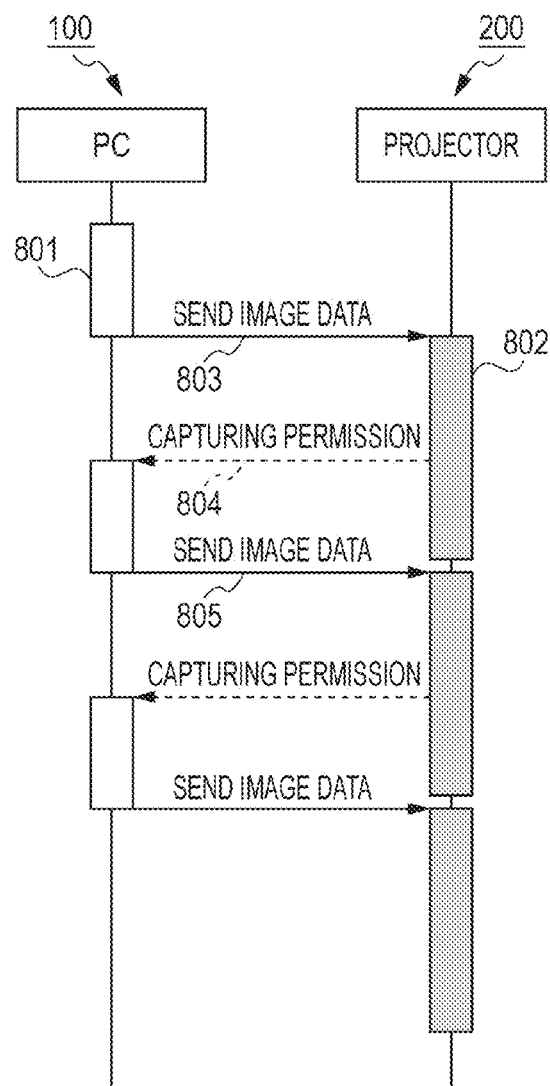
FIG. 8 is a diagram illustrating the flow of the entire processing according to the first embodiment.

FIG. 8 illustrates the outline of processing performed by the PC 100 and the projector 200 in the present embodiment. After the PC 100 performs a series of processes including a screen capturing process and an image data compressing process (801), the PC 100 sends the image data to the projector 200 (803). The projector 200, which has received the image data, performs a series of processes including an image data decoding process and an image data displaying process (802). In order that the next image data will be sent immediately after displaying on the projector 200 is completed, the projector 200 sends, before displaying is completed, a screen capturing permission notification to the PC 100 while executing the process in 802 (804). The screen capturing is, by using a driver, obtaining screen data displayed on the display unit 111 of the PC 100 and temporarily storing the screen data in the RAM 103.

The PC 100, which has received the notification, can capture the screen and send the next image data at a timing at which processing performed by the projector 200 is completed (805).

Figure 3:
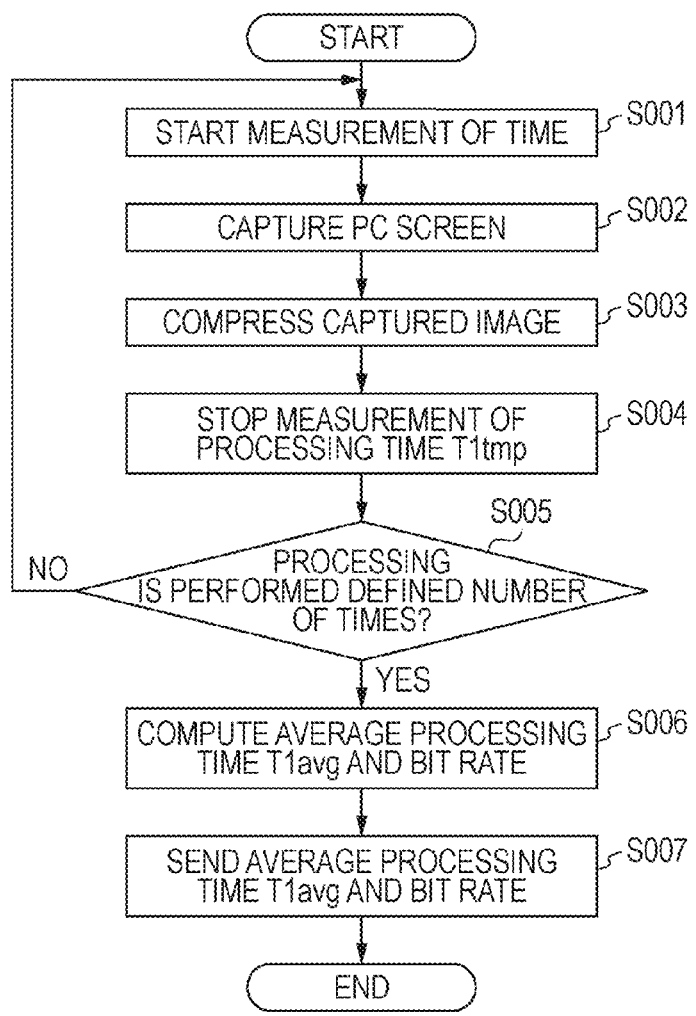
FIG. 3 is a flowchart illustrating a process of computing the processing rate of the PC according to a first embodiment.
Figure 4:
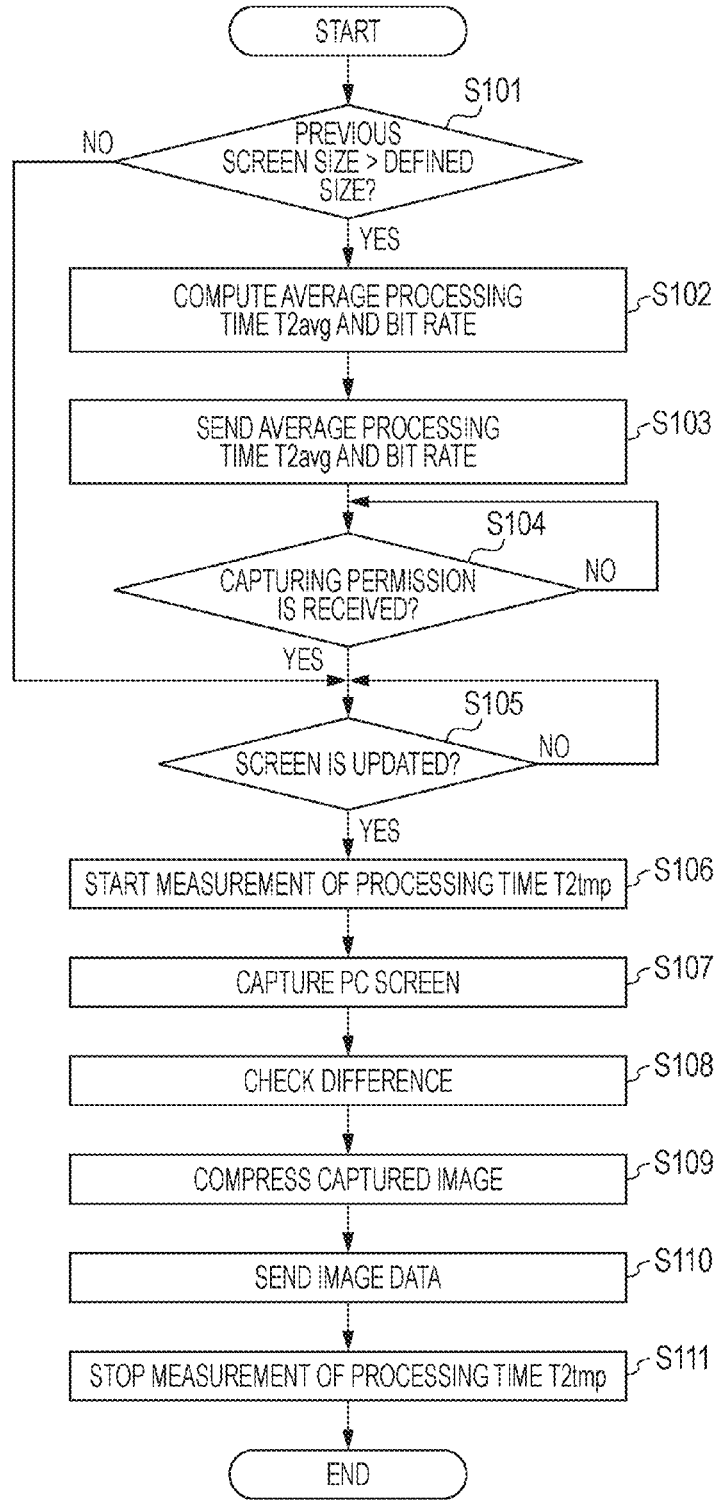
FIG. 4 is a flowchart illustrating a process performed by the PC according to the first embodiment.
Figure 5:
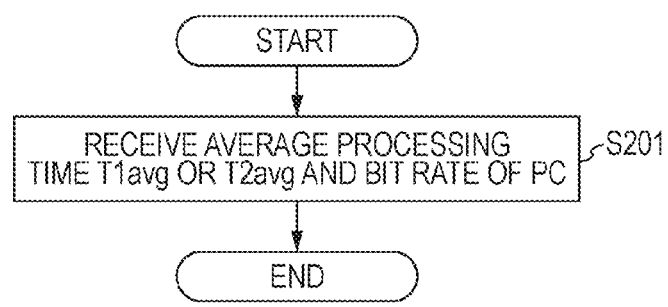
FIG. 5 is a flowchart illustrating a process performed by the projector according to the first embodiment.

The foregoing is the outline of the processing performed by the PC 100 and the projector 200. Referring now to FIGS. 3 to 5, processes performed by the PC 100 and the projector 200 will be described in detail.

FIG. 3 is a flowchart illustrating the flow of a process performed until a notification of the processing rate of the PC 100 is sent to the projector 200 before the screen is sent. The process in the flowchart illustrating the operation of the PC 100 below is realized by controlling, with the CPU 101, each unit of the PC 100 in accordance with a program and input signals.

The flowchart is started when the PC 100 reads an image transferring program from the HDD 104. When the program is started, a measurement of a processing time T1tmp is started immediately before an image displayed on the PC 100 is captured (S001).

Next, image data is obtained from the VRAM 108, which stores image data for capturing image data displayed on the display unit 111 (S002).

When obtaining of the image data is completed, the obtained image data is compressed in a certain compression format such as Joint Photographic Experts Group (JPEG) (S003). At this time, any compression format may be used.

The measurement is stopped immediately after the compression is completed. Accordingly, the processing time T1tmp elapsed in steps S002 and S003 is measured (S004). The measured processing time T1tmp is stored in the RAM 103.

It is determined whether the processing in steps S001 to S004 described above has been performed and the processing time T1tmp has been measured a number of times defined by the image transferring program (S005). When the processing has not been performed the defined number of times and the processing time T1tmp has not been measured the defined number of times, the processing in steps S001 to S004 is performed again. When the processing has been performed the defined number of times and the processing time T1tmp has been measured the defined number of times, the flow proceeds to the next processing.

Next, an average T1avg of the processing times T1tmp measured by repeating the processing in steps S001 to S004 the defined number of times, and the processing rate are computed (S006).

When the average T1avg is computed, a notification of the average processing time T1avg and the processing rate of the PC 100 is sent to the projector 200 via the network IF 106 (S007). At this point, the captured image data has not been sent to the projector 200 yet.

The process of measuring the processing rate of the PC 100 before sending image data has been described above. Referring now to FIG. 4, the flow of a process to be executed by the PC 100 in accordance with the image transferring program after a user gives an instruction to start sending image data will be described.

When the previous screen has already been captured, the just captured image data and the size thereof are stored in the RAM 103. Whether the size of the just captured image data stored in the RAM 103 is greater than a size defined by the image transferring program is determined (S101).

When it is determined in step S101 that the size stored in the RAM 103 is greater than the defined size, an average processing time T2avg of the sum of processing times required in processes including capturing, difference checking, compression, and communication performed by the PC 100, and a processing rate of the PC 100 are computed (S102). The average processing time T2avg is the average of times T2tmp required for the processing in steps S107 to S110 described later. Although T2avg has been described as the average of the sum of processing times in steps S107 to S110, the average processing time may be obtained in each process.

Next, a notification of the computed average processing time T2avg and the processing rate is sent to the projector 200 via the network IF 106 (S103).

When the notification is completed, the PC 100 waits for a capturing permission command from the projector 200 (S104). The capturing permission is a signal to be sent by the projector 200 at a timing in accordance with its processing state.

When the PC 100 receives the capturing permission via the network IF 106, the PC 100 determines whether there is a change in what is displayed on the display unit 111 (S105). Whether there is a change in what is displayed on the display unit 111 is determined by inquiring of a driver program that controls the image processor 109 about whether what is displayed on the display unit 111 is updated and causing the driver program to send a notification of whether there is a change.

When it is determined in step S101 that the stored size is less than or equal to the defined size, the processing in steps S102 to S104 described above is skipped, and whether there is a change in what is displayed on the display unit 111 is determined (S105). When the processing in step S101 is performed for the first time, there is no immediately previous captured image. Thus, the processing in steps S102 to S104 is skipped, and the flow proceeds to step S105.

When there is a change in image data in step S105, a measurement of the processing time T2tmp is started (S106).

When the measurement is started, image data is obtained from the VRAM 108, which stores image data for capturing image data displayed on the display unit 111 (S107). The captured image data is stored in the RAM 103.

Next, the place where there has been a change is specified by comparing the stored image data with the immediately previous image data (S108).

When the place where there has been a change is specified, a region of the changed image data is compressed by the encoder 105 in a certain compression format, such as JPEG (S109). At this time, any compression format may be used. When there is no encoder 105, the image is compressed using a compression program.

Next, the compressed image data is sent via the network IF 106 to the projector 200 (S110). When sending is completed, the measurement is stopped, and the processing time T2tmp elapsed in steps S107 to S110 is computed (S111). Although T2tmp has been described as the processing time T2tmp elapsed in steps S107 to S110, the processing time may be measured in each step. The measured processing time T2tmp is stored in the RAM 103.

The processing in step S101 will be described in detail. In the present embodiment, it is assumed that a certain amount of time is required, from receiving of image data at the projector 200 to actually projecting the image by using the projector 200. That is, when the size of image data being projected by the projector 200 is great to a certain degree, image data can be efficiently sent by sending the image data from the PC 100 in response to a capturing permission that is sent at a timing of the projector 200.

In contrast, when the size of image data being projected by the projector 200 is small and it does not take much time until projection, it is more efficient for the PC 100 not to wait for a capturing permission and to immediately execute capturing and sending of image data. Therefore, in the flowchart illustrated in FIG. 4, when the image size is greater than the defined size in step S101, the PC 100 waits for a capturing permission from the projector 200 in step S104. Only if there is a capturing permission, the PC 100 captures image data in step S107 and sends the captured image data. When the image size is less than or equal to the defined size in step S101, step S104 is skipped, and the PC 100 captures image data in step S107 and sends the captured image data.

Because of the foregoing reason, also in the process illustrated in FIG. 7 below, the projector 200 sends no capturing permission to the PC 100 when the size of the image data is less than or equal to the defined size.

Referring now to FIG. 5, a process of receiving, at the projector 200, the processing time of the PC 100, which is sent from the PC 100, will be described.

The projector 200 receives, at the network IF 205, the average processing time T1avg or T2avg sent from the PC 100 via the network IF 106, stores the received average processing time T1avg or T2avg in the RAM 203, and terminates the process (S201).

Alternatively, in step S201, the projector 200 may receive information regarding the capability of the PC 100, such as the image data decoding capability, and calculate the average processing time T1avg or T2avg.

Figure 6:
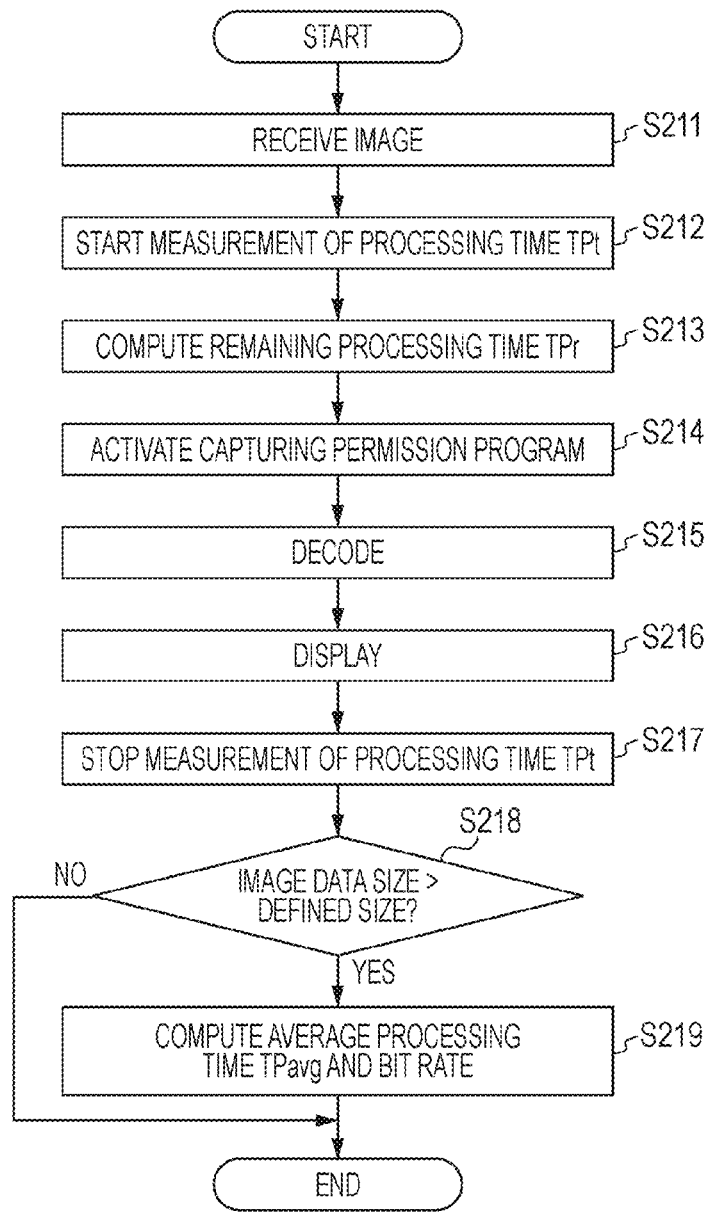
FIG. 6 is a flowchart illustrating a process performed by the PC according to a second embodiment.

FIG. 6 is a flowchart illustrating a process performed by the projector 200 of receiving and displaying image data in accordance with an image processing program. The process in the flowchart illustrating the operation of the projector 200 below is realized by controlling, with the CPU 201, each unit of the projector 200 in accordance with the program and input signals.

First, image data received from the network IF 205 is stored in the RAM 203 (S211). A header exists at the beginning of the image data and includes information such as a compression format and a size of the image data. The information such as a compression format and a size of the image data is also stored in the RAM 203.

When an amount of image data that is sufficient for starting decoding of the image data is received, a measurement of a processing time TPt of the projector 200 is started (S212).

When the measurement is started, a remaining processing time TPr is computed from the size information of the image data, which is included in the header of the image data, and a processing rate (bit rate) of the projector 200 that is defined in advance in the program of the projector 200 (S213). Alternatively, the processing time TPr may be obtained by dividing the image size (Mbyte) by the processing rate (Mbps) computed in step S219 below.

Figure 7:
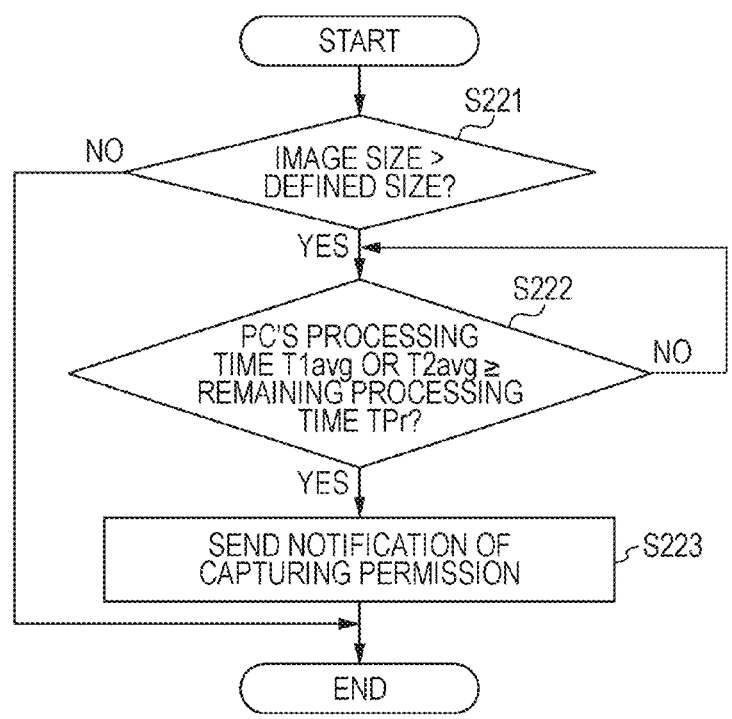
FIG. 7 is a flowchart illustrating a process performed by the projector according to the second embodiment.

When the remaining processing time TPr is obtained, a capturing permission notification program for sending a notification of a capturing permission, which is illustrated in FIG. 7, is activated (S214).

Next, the decoder 204 decodes the image data (S215). If the projector 200 includes no decoder 204, the image data may be decoded using a decoding program.

After decoding is completed, the image is projected by the projecting unit 208 via the projection controller 207 (S216). When the sent image data is not for the entire screen but for a part of the screen, the image data for the part of the screen is updated and displayed.

When projection is completed, the measurement of the processing time TPt of the projector 200, which has been measured since step S212, is stopped, and the processing time of processing performed by the projector 200 is stored in the RAM 203 (S217).

Next, whether the size of the received image data is greater than the defined size is determined (S218). When the image size is greater than the defined size, the measured processing time TPt of the projector 200 is combined with a known measurement result, thereby computing an average processing time TPavg and a processing rate (S219). Thus, the process is terminated. In contrast, when the size of the received image data is less than or equal to the defined size, the processing time TPt is not used in computing the average, and the process is terminated.

Referring now to FIG. 7, an example of the operation of the projector 200 in the process of sending a notification of a capturing permission from the projector 200 to the PC 100 will be described.

The process illustrated in FIG. 7 is started by activating the capturing permission notification program in step S214 described above.

When the size of the received image data is greater than the size defined by the program, the processing in the next step is performed; when the size is less than or equal to the defined size, the process is terminated (S221).

When the size of the image data is greater than the defined size, the remaining processing time TPr, which is computed in step S213 and which is until the image is projected by the projector 200 onto the projecting unit 208, is compared with the average processing time T1avg or T2avg of the PC 100, which is received in step S201 (S222). Two methods of computing the processing time of the PC 100 are available. One method is a method of using the received processing time as it is as the processing time of the PC 100. The other method is a method of computing the processing time of the PC 100 from the received processing time (Mbps) and the average data size (Mbyte) of, among items of image data, items of image data whose size exceeds the defined size.

When the average processing time T1avg or T2avg of the PC 100 is greater than or equal to the remaining processing time TPr of the projector 200, the projector 200 is in a state where the projector 200 will have completed the processing before the next image data is sent from the PC 100. Therefore, the projector 200 immediately sends a notification of a capturing permission via the network IF 205 to the PC 100 (S223). In contrast, while the average processing time T1avg or T2avg of the PC 100 is less than the remaining processing time TPr of the projector 200, the process is returned to step S222.

When multiple projectors are connected to the PC 100, capturing is executed in accordance with a capturing permission sent from one of the projectors that first sent the capturing permission to the PC 100.

As described above, the projector 200 receives the processing rate of the PC 100, computes an appropriate capturing timing from the processing rate of the PC 100 and the processing rate of the projector 200, and sends a notification of a capturing permission at the computed timing. In this manner, image data can be sent at an appropriate timing by computing an appropriate capturing timing in accordance with the performance of the apparatuses using a first time and a second time that are the time needed for the PC 100 and the time needed for the projector 200, respectively.

In the first embodiment, the projector 200 sends a notification of a capturing permission in accordance with its processing state, and the PC 100 performs capturing in accordance with the capturing permission. In contrast, in the present embodiment, the PC 100 computes a capturing processing timing and performs capturing.

Since many portions in the present embodiment are common to those in the first embodiment, descriptions of the common portions are omitted, and portions that are unique to the present embodiment will be mainly described.

Figure 9:
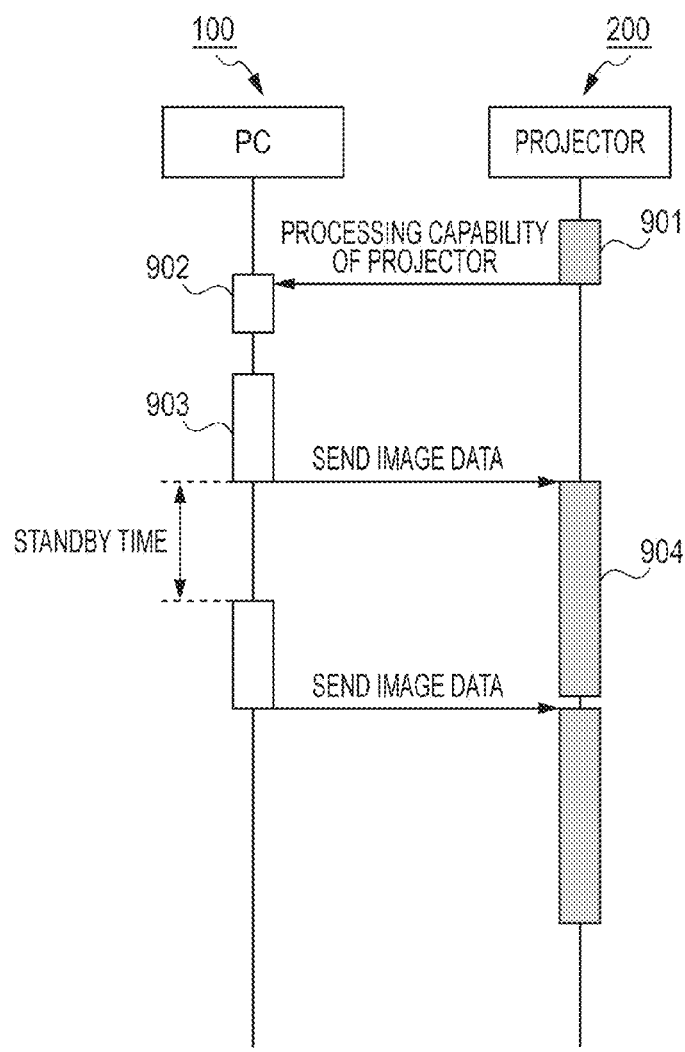
FIG. 9 is a diagram illustrating the flow of the entire processing according to the second embodiment.

FIG. 9 illustrates the outline of processing performed by the PC 100 and the projector 200 in the present embodiment.

The projector 200 sends the processing time to the PC 100 (901).

Next, the PC 100 receives the processing rate of the projector 200, which is sent from the projector 200 (902).

Next, after the PC 100 performs a series of processes including a screen capturing process and an image data compressing process (903), the PC 100 sends the image data to the projector 200.

The projector 200, which has received the image data, performs a series of processes including an image data decoding process and an image data displaying process (904). The PC 100 computes, on the basis of the received processing rate of the projector 200, a timing at which the projector 200 can receive the next image data, and sets a standby time. When the standby time elapses, the PC 100 captures the screen, and sends the captured image data to the projector 200.

The foregoing is the outline of the processing. Hereinafter, the detailed operation will be described.

Figure 10:
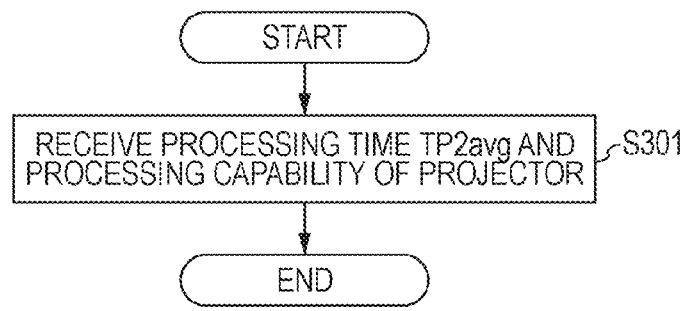
FIG. 10 is a flowchart illustrating a process performed by the PC according to the second embodiment.

FIG. 10 is a process of receiving, at the PC 100, the processing time of the projector 200, which is sent from the projector 200.

As illustrated in FIG. 10, the PC 100 receives the processing time and the processing rate TP2avg of the projector 200, which are sent from the projector 200, via the network IF 106, stores the received average processing time TP2avg and the processing rate of the projector 200 in the RAM 103, and terminates the process (S301). Computation of the average processing time TP2avg will be described later.

Figure 11:
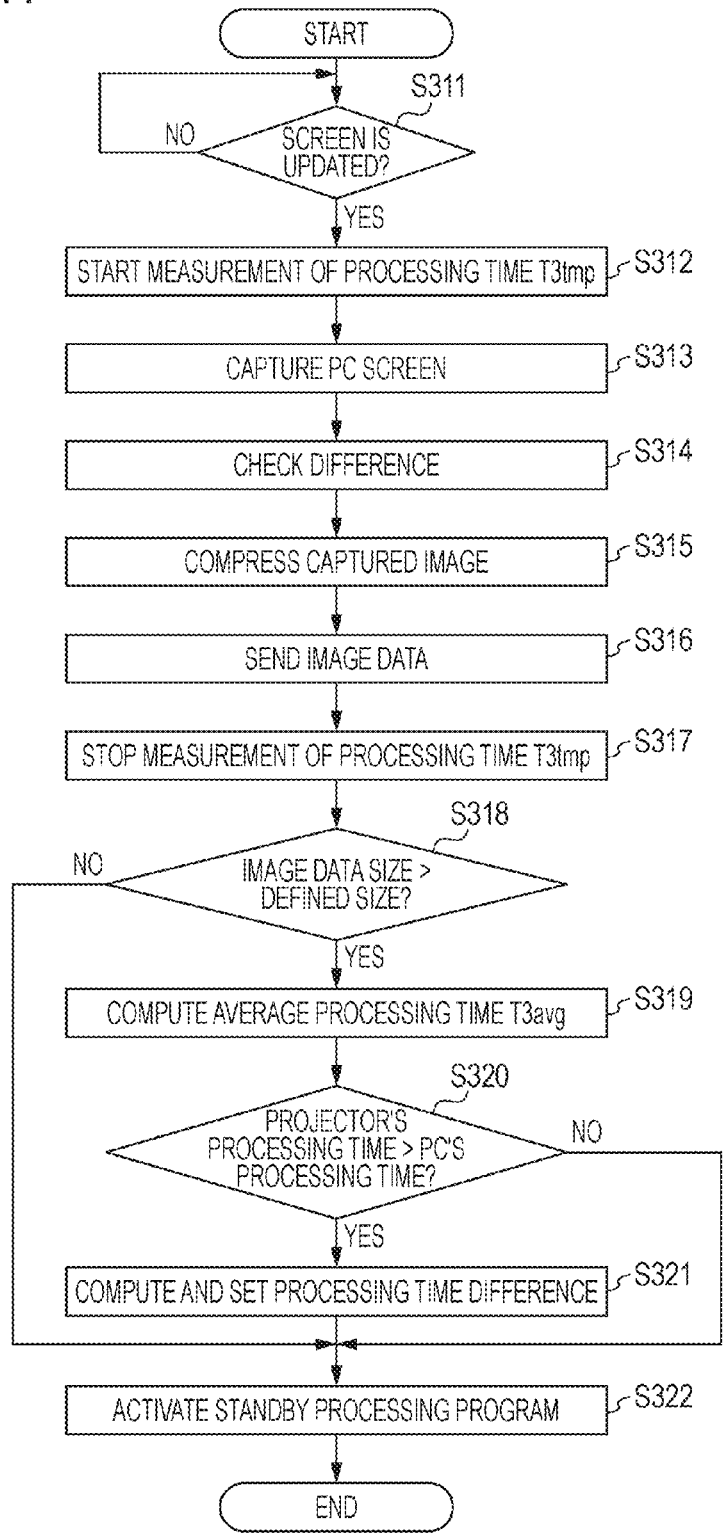
FIG. 11 is a flowchart illustrating a process performed by the PC according to the second embodiment.

FIG. 11 is a flowchart illustrating an example of a process executed by the PC 100, which captures and sends a screen, in accordance with the image transferring program.

First, whether there is a change in image data to be displayed is determined (S311). Whether there is a change in what is displayed on the display unit 111 is determined by inquiring of a driver program that controls the image processor 109 about whether what is displayed on the display unit 111 is updated and causing the driver program to send a notification of whether there is a change.

When there is a change in the image data, a measurement of a processing time T3tmp of the PC 100 is started (S312).

When the measurement is started, image data is obtained from the VRAM 108, which stores image data for capturing image data displayed on the display unit 111 (S313). The captured image data is stored in the RAM 103.

Next, the place where there has been a change is specified by comparing the stored image data with the immediately previous image data (S314).

When the place where there has been a change is specified, a region of the changed image data is compressed by the encoder 105 in a certain compression format, such as JPEG (S315). At this time, any compression format may be used. When there is no encoder 105, the image is compressed using a compression program, and the compressed data is stored in the RAM 103.

The compressed image data is sent via the network IF 106 to the projector 200 (S316).

When sending is completed, the processing time T3tmp elapsed in steps S313 to S316 is computed (S317). Although T3tmp has been described as the processing time T3tmp elapsed in steps S313 to S316, the processing time may be measured in each step. The measured processing time T3tmp is stored in the RAM 103.

Next, the size of the image data sent in step S316 is obtained from the RAM 103, and the size is compared with the size defined by the image transferring program (S318). When the size is greater than the defined size, an average processing time T3avg is computed from the measurement result of the processing time of the PC 100, which is obtained in step S317, and a known processing time (S319).

The average processing time T3avg of the PC 100, which is computed in step S319, is compared with the average processing time TP2avg of the projector 200, which is received from the projector 200 in step S301. When the average processing time TP2avg of the projector 200 is less than or equal to the average processing time T3avg of the PC 100, the process is terminated (S320). Otherwise, the difference between the average processing time TP2avg of the projector 200 and the average processing time T3avg of the PC 100 is computed, the difference is stored in the RAM 103, and the process is terminated (S321). When what is received from the projector 200 is the processing rate (bit rate) of the projector 200, the processing time is computed by calculating an operation. Specifically, the average data size (Mbyte) of items of image data whose size is greater than the defined size in step S318 is divided by the processing rate (Mbps), thereby computing the average processing time TP2avg of the projector 200.

Figure 12:
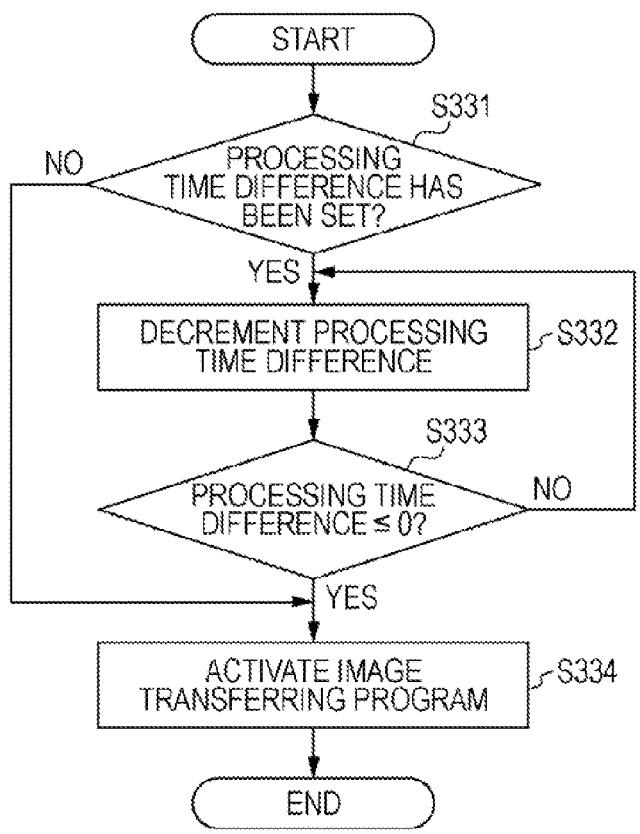
FIG. 12 is a flowchart illustrating a process performed by the PC according to the second embodiment.

After the foregoing process is terminated, a standby processing program illustrated in FIG. 12 is activated (S322).

FIG. 12 illustrates an example of the flow of a process executed by the PC 100 in accordance with the standby processing program.

This program is executed in accordance with the standby processing program after the image transferring program illustrated in FIG. 11 is terminated. Alternatively, the following process may be embedded into the image transferring program and may be executed by the PC 100.

First, in step S321, whether a difference between processing times of the projector 200 and the PC 100 has been set is determined from a value stored in the RAM 103 (S331).

Next, as time elapses, the processing time difference is decremented by the elapsed time (S332).

Whether the processing time difference becomes zero or less is determined (S333). When the processing time difference becomes zero or less, the image transferring program is activated in order to capture the next screen, and the process is terminated (S334). When the processing time difference is greater than zero, the processing time difference is decremented.

Figure 13:
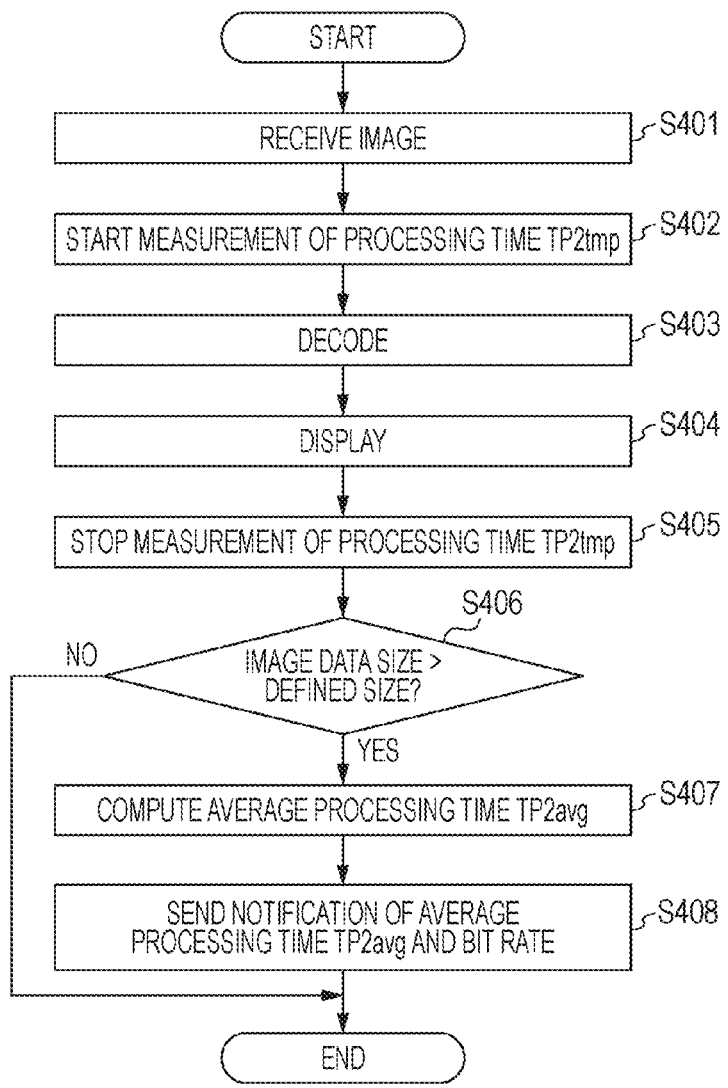
FIG. 13 is a flowchart illustrating a process performed by the projector according to the second embodiment.

FIG. 13 illustrates the flow of a process performed by the projector 200 in the present embodiment.

Image data received via the network IF 205 is stored in the RAM 203 (S401). A header exists at the beginning of the image data and includes information such as a compression format and a size of the image data. The information such as a compression format and a size of the image data is also stored in the RAM 203.

When an amount of image data that is sufficient for starting decoding of the image data is received, a measurement of the processing time TP2tmp of the projector 200 is started (S402).

Next, the decoder 204 decodes the image data (S403). If the projector 200 includes no decoder 204, the image data may be decoded using a decoding program.

After decoding is completed, the image is projected by the projecting unit 208 via the projection controller 207 (S404). When the sent image data is not for the entire screen but for a part of the screen, the image data for the part of the screen is updated and displayed.

When projection is completed, the measurement of the processing time TP2tmp of the projector 200, which has been measured since step S402, is stopped, and the processing time of processing performed by the projector 200 is stored in the RAM 203 (S405).

Next, whether the size of the received image data is greater than the defined size is determined (S406). It is assumed that the size of the image data has been obtained from the size information of the image data, which is included in the header of the image data.

When the image data size is greater than the defined size, the measured processing time TP2tmp of the projector 200 is combined with a known measurement result, thereby computing the average processing time TP2avg and the processing rate (S407). In contrast, when the size of the received image data is less than or equal to the defined size, the data is not used in computing the average, and the process is terminated.

A notification of the computed average processing time TP2avg and the processing rate is sent via the network IF 205 to the PC 100 (S408).

When multiple projectors are connected to the PC 100, one of the projectors that has the shortest processing time or the highest processing rate serves as a reference. In step S321, the processing time difference is computed from the processing time or the processing rate of the projector serving as a reference. In accordance with the computed processing time difference, a determination is made in step S333.

As described above, the PC 100 receives the processing rate of the projector 200, computes an appropriate capturing timing from the processing rate of the PC 100 and the processing rate of the projector 200, and performs capturing at the computed timing. In this manner, image data can be efficiently sent at an appropriate timing.

The present invention may be achieved by supplying a storage medium storing program code of software for realizing the functions of the foregoing embodiments to an apparatus, and reading and executing the program code stored in the storage medium by using a computer (or a CPU or a microprocessing unit (MPU)) of the apparatus.

In this case, the program code itself read from the storage medium realizes the functions of the foregoing embodiments, and the program code itself and a storage medium storing the program code constitute the present invention.

Examples of the storage medium used to supply the program code include a flexible disk, a hard disk, an optical disk, a magneto-optical disk, a compact-disc read-only memory (CD-ROM), a compact disc-recordable (CD-R), a magnetic tape, a nonvolatile memory card, and a ROM.

An OS running on the apparatus may execute part of or the entirety of actual processing on the basis of instructions of the program code to realize the functions of the foregoing embodiments.

Furthermore, the program code read from the storage medium may be written into a memory included a function expansion board placed in the computer or a function expansion unit connected to the computer, and may execute part of or the entirety of the processing to realize the functions of the foregoing embodiments. In this case, a CPU included in the function expansion board or the function expansion unit may execute the actual processing on the basis of instructions of the program code.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Patent Application No. 2008-324172 filed Dec. 19, 2008, which is hereby incorporated by reference herein in its entirety.

What is claimed is:

1. A display controlling apparatus that is capable of communicating with an image processing apparatus that sends image data to the display controlling apparatus in response to a notification from the display controlling apparatus, comprising:
    a sending unit configured to send the notification to the image processing apparatus;
    a first receiving unit configured to receive the image data sent from the image processing apparatus in response to the notification; and
    a first computing unit configured to compute a first time required to display the image data received by the first receiving unit,
    wherein the sending unit sends a new notification to the image processing apparatus at a timing based on the first time computed by the first computing unit.

2. The display controlling apparatus according to claim 1, further comprising a second receiving unit configured to receive a second time required for processing performed by the image processing apparatus to capture new image data and to send the captured new image data to the display controlling apparatus,
    wherein the sending unit sends the notification to the image processing apparatus when the first time becomes less than the second time.

3. The display controlling apparatus according to claim 2, further comprising a second computing unit, wherein the second computing unit computes the second time on the basis of information received by the second receiving unit and a size of the image data received by the first receiving unit.

4. The display controlling apparatus according to claim 1, wherein the first computing unit computes the first time on the basis of a size of the image data received by the first receiving unit.

5. An image processing apparatus that is capable of communicating with a display controlling apparatus, comprising:
    a capturing unit configured to capture image data;
    a sending unit configured to send the image data captured by the capturing unit to the display controlling apparatus; and
    a receiving unit configured to receive a first time required for the display controlling apparatus to display the image data sent by the sending unit,
    wherein the capturing unit captures new image data at a timing based on the first time received by the receiving unit.

6. The image processing apparatus according to claim 5, further comprising a second receiving unit configured to receive a notification sent from the display controlling apparatus, the notification being sent from the display controlling apparatus at a timing based on the first time,
    wherein the capturing unit captures new image data upon receipt of the notification.

7. The image processing apparatus according to claim 5, wherein, when a size of the image data captured by the capturing unit is less than a predetermined size, the capturing unit captures the new image data without receiving a notification by using the second receiving unit.

8. The image processing apparatus according to claim 5, further comprising a converting unit configured to convert the image data captured by the capturing unit,
    wherein the sending unit sends the converted image data, which is converted by the converting unit.

9. A method of controlling a display controlling apparatus that is capable of communicating with an image processing apparatus that sends image data to the display controlling apparatus in response to a notification from the display controlling apparatus, comprising the steps of:
    sending the notification to the image processing apparatus;
    receiving the image data sent from the image processing apparatus, the image data being sent in response to the notification; and
    computing a first time required to display the received image data,
    wherein a new notification is sent to the image processing apparatus at a timing based on the first time computed in the step of computing a first time.

10. A method for controlling an image processing apparatus that is capable of communicating with a display controlling apparatus, comprising the steps of:
    capturing image data;
    sending the captured image data to the display controlling apparatus; and
    receiving a first time required for the display controlling apparatus to display the image data sent in the step of sending the captured image data,
    wherein new image data is captured at a timing based on the first time received in the step of receiving a first time.

* * * * *